US012548432B2

(12) United States Patent
Schuman

(10) Patent No.: US 12,548,432 B2
(45) Date of Patent: Feb. 10, 2026

(54) ALERT COMMUNICATION NETWORK, ASSOCIATED PROGRAM PRODUCTS, AND METHODS OF USING THE SAME

(71) Applicant: Joseph Schuman, New York, NY (US)

(72) Inventor: Joseph Schuman, New York, NY (US)

( * ) Notice: Subject to any disclaimer, the term of this patent is extended or adjusted under 35 U.S.C. 154(b) by 0 days.

(21) Appl. No.: 17/362,150

(22) Filed: Jun. 29, 2021

(65) Prior Publication Data

US 2021/0327257 A1 Oct. 21, 2021

Related U.S. Application Data

(63) Continuation of application No. 16/800,539, filed on Feb. 25, 2020, now Pat. No. 11,049,385, which is a continuation of application No. 14/524,487, filed on Oct. 27, 2014, now Pat. No. 10,573,169.

(60) Provisional application No. 61/895,679, filed on Oct. 25, 2013.

(51) Int. Cl.
*G08B 29/18* (2006.01)
*G08B 25/08* (2006.01)

(52) U.S. Cl.
CPC ........... *G08B 29/188* (2013.01); *G08B 25/08* (2013.01)

(58) Field of Classification Search
None
See application file for complete search history.

(56) References Cited

U.S. PATENT DOCUMENTS

| | | | | |
|---|---|---|---|---|
| 2010/0048164 A1* | 2/2010 | Boutihane | G08G 1/205 | 455/11.1 |
| 2014/0276239 A1* | 9/2014 | Subramaniam | A61B 5/746 | 600/595 |
| 2015/0016001 A1* | 1/2015 | Quirk | H02H 5/083 | 361/78 |
| 2016/0270717 A1* | 9/2016 | Luna | A61B 5/743 | |

* cited by examiner

*Primary Examiner* — Thomas S McCormack
(74) *Attorney, Agent, or Firm* — Tarter Krinsky & Drogin LLP

(57) ABSTRACT

An alert communication server is disclosed, and includes one or more processors, one or more modules of non-transitory computer-readable memory, a correlation module, and a transmission module. The one or more modules of non-transitory computer-readable memory store a set of instructions and are electronically coupled with the one or more processors to implement at least one instruction of the set of instructions. The correlation module is electronically connected to receive a first set of data from a first device and a second set of data from a second device. The correlation module is configured to apply a correlation algorithm to the first set of data and the second set of data to determine one or more conditions. The transmission module is configured to communicate with one or more of the first device and the second device based upon the one or more conditions determined by the correlation module.

16 Claims, 9 Drawing Sheets

1000

ALERT COMMUNICATION NETWORK, ASSOCIATED PROGRAM PRODUCTS, AND METHODS OF USING THE SAME

CROSS-REFERENCE TO RELATED APPLICATION

This application is a continuation of U.S. application. Ser. No. 16/800,539, filed Feb. 25, 2020 which is to issue as U.S. Pat. No. 11,049,385 on Jun. 29, 2021, which itself is a continuation of U.S. application. Ser. No. 14/524,487 filed Oct. 27, 2014 which issued as U.S. Pat. No. 10,573,169 on Feb. 25, 2020, which itself claims priority to and the benefit of U.S. Provisional Patent Application No. 61/895,679, filed on Oct. 25, 2013, the entire contents of which are incorporated by reference herein.

FIELD OF INVENTION

The present invention generally relates to an alert communication network, associated program products, and methods of using the same.

SUMMARY

According to an exemplary embodiment of the present invention, an alert communication server is disclosed, and comprises one or more processors, one or more modules of non-transitory computer-readable memory, a correlation module, and a transmission module. The one or more modules of non-transitory computer-readable memory store a set of instructions and are electronically coupled with the one or more processors to implement at least one instruction of the set of instructions. The correlation module is electronically connected across a data network to receive a first set of data from a first device and a second set of data from a second device connected across the data network. The correlation module is configured to apply a correlation algorithm to the first set of data and the second set of data to determine one or more conditions. The transmission module is configured to communicate with one or more of the first device and the second device based upon the one or more conditions determined by the correlation module.

In embodiments, the alert communication server further comprises a device control module configured to initiate an action of one of the first device and the second device.

In embodiments, the device control module is configured to activate a microphone of one of the first device and the second device.

In embodiments, the device control module is configured to activate a speaker of one of the first device and the second device.

In embodiments, the device control module is configured to initiate a low power setting of one of the first device and the second device.

In embodiments, the device control module is configured to initiate a communication between one of the first device and the second device and a support provider.

In embodiments, the device control module is configured to display an image on one of the first device and the second device.

In embodiments, the device control module is configured to cause one or more audible sounds to project from one of the first device and the second device.

In embodiments, the transmission module is configured to communicate with a support provider.

According to an exemplary embodiment of the present invention, a computer-implemented method is disclosed, and comprises: (a) retrieving, by an alert communication server having one or more processors configured to read one or more instructions of a set of instructions stored on a non-transitory computer-readable medium, a first set of data associated with one or more of a condition of a user and an environmental condition; (b) retrieving, by the emergency alert server, a second set of data associated with one or more of a condition of a user and an environmental condition; (c) determining, by a correlation module of the alert communication server, one or more conditions based upon the first set of data and the second set of data; and (d) transmitting, by a transmission module of the alert communication server, data for one or more of display and projection on an electronic device connected to the alert communication server across a data network.

In embodiments, the method further comprises the step of initiating, by a device control module of the alert communication server, a function of the electronic device connected to the alert communication server across a data network.

In embodiments, the device control module is configured to activate a microphone of the electronic device.

In embodiments, the device control module is configured to activate a speaker of the electronic device.

In embodiments, the device control module is configured to activate a low-power setting of the electronic device.

In embodiments, the device control module is configured to initiate a communication between the electronic device and a third party.

In embodiments, the device control module is configured to display an image on the electronic device.

In embodiments, the transmission module is configured to communicate with a third party.

BRIEF DESCRIPTION OF THE DRAWINGS

Various exemplary embodiments of this invention will be described in detail, with reference to the following figures, wherein.

DETAILED DESCRIPTION

The present invention generally relates to an alert communication network, associated program products, and methods of using the same.

In embodiments, the present invention is directed to an alert communication network having an alert communication server that can communicate with a subscriber device or other connected electronic device, initiate a function of the subscriber device and/or other connected electronic device, and/or initiate a communication with an external support provider based upon data received from the subscriber device and at least one other connected electronic device.

In this regard, the alert communication network initiates an action based on one or more conditions relating to one or more users associated with an electronic device connected to the alert communication network and/or an ongoing environmental situation that may relate to the one or more users associated with an electronic device connected to the alert communication network through the coordinated analysis and transformation of data received from multiple connected devices. Thus, the alert communication network of the present invention, through the action of a uniquely configured alert communication server, provides "smart" alert communication capabilities that take advantage of the proliferation of electronic devices having communication and/or physical sensing capabilities by allowing multiple electronic devices to provide data to the alert communication server for analysis, processing, and/or determination of an appropriate response.

In embodiments, program products associated with the alert communication network may include websites or other electronic platforms such as computer software applications that can be run on one or more electronic devices having one or more non-transitory storage mediums upon which instructions can be read, for example, by one or more processors or other computing devices, so that alert communication data can be transmitted to a subscriber device and/or to other devices connected along the alert communication network.

Figure 1:
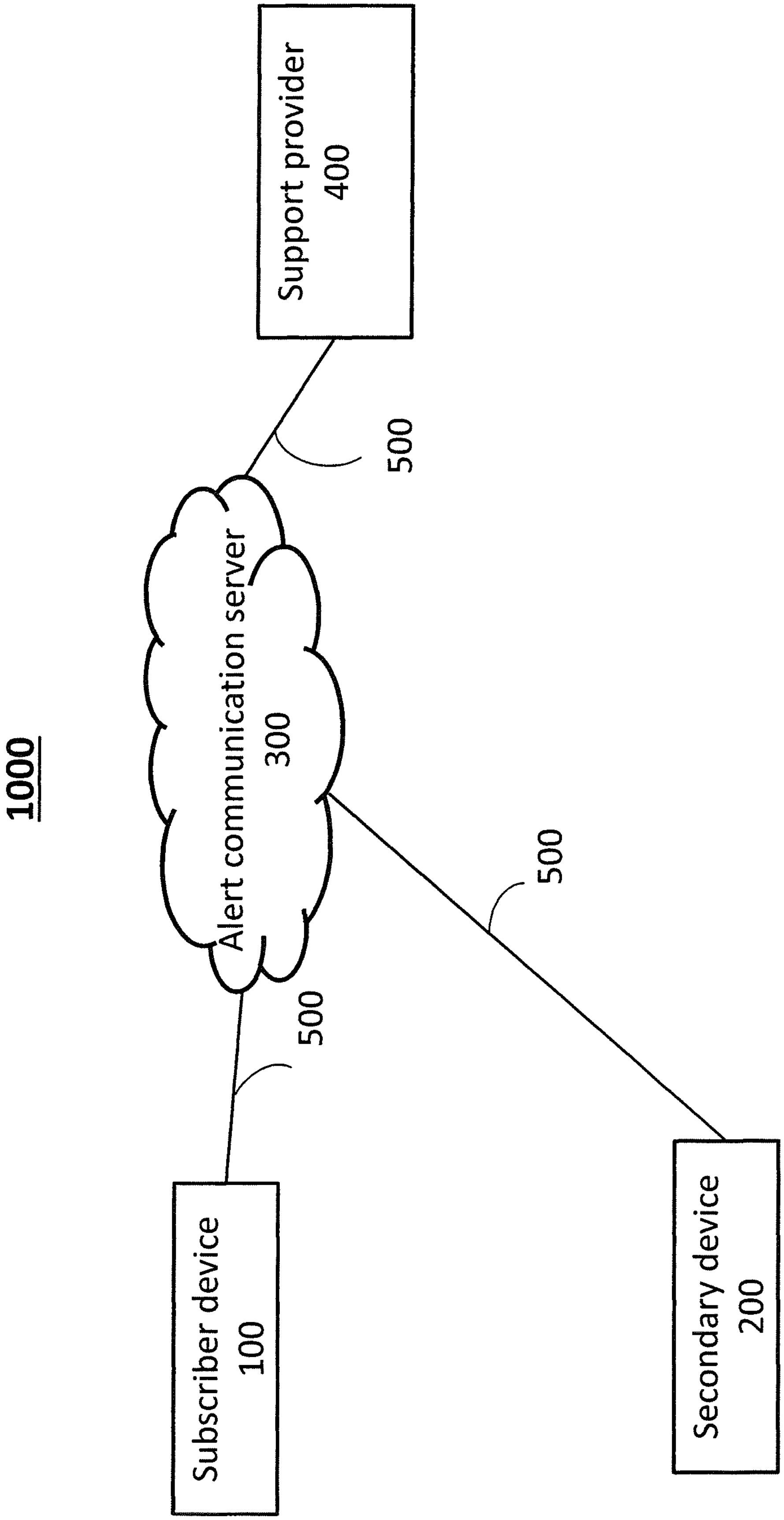
FIG. 1 is a schematic diagram of an alert communication network according to an exemplary embodiment of the present invention.

Turning to FIG. 1, an exemplary embodiment of an alert communication network is illustrated, and is generally designated 1000. Alert communication network 1000 includes at least one subscriber device 100, at least one secondary device 200, an alert communication server 300, and at least one support provider 400. Subscriber device 100, secondary device 200, and support provider 400, as shown, are each electronically connected to alert communication server 400 along a data network 500. In embodiments, two or more of subscriber device 100, secondary device 200, and/or support provider 400 may be directly electronically connected to one another along data network 500. In embodiments, alert communication network 1000 may include a different number of subscriber devices 100, secondary devices 200, alert communication servers 300, and/or support providers 400, for example, one, two, three, four, or five, to name a few, in different combinations or separations. In embodiments, alert communication network 1000 may be devoid of one or more of subscriber device 100, secondary device 200, alert communication server 300, and/or support provider 400.

Subscriber device 100 may be a device that is electronically connectable to alert communication server 300 and configured to relay data therebetween that pertains to one or more conditions of one or more users associated with subscriber device 100 and/or secondary device 200, and/or to an environmental condition that may relate to one or more users associated with subscriber device 100 and/or secondary device 200. In embodiments, subscriber device 100 is capable receiving a physical input from a user, e.g., a tactile, visual, motion-based, and/or audio input, and converting the input into data for transmission to alert communication server 300. In embodiments, subscriber device 100 may be configured to receive raw input data, for example, from secondary device 200. In embodiments, subscriber device 100 may display/or project information relayed from alert communication server 300 in a format that is visible, audible, and/or otherwise capable of being received by a human operator of subscriber device 100. In embodiments, subscriber device 100 may be a smartphone, a tablet computer, a laptop computer, a desktop computer, and/or a wearable computer such as a smartwatch or other bodily-mounted computing device, e.g., Google Glass™, to name a few.

Secondary device 200 may be a device that is electronically connectable to alert communication server 300 and/or subscriber device 100 and configured to detect, e.g., through one or more sensors, one or more conditions of one or more users associated with subscriber device 100 and/or secondary device 200, and/or to an environmental condition that may relate to one or more users associated with subscriber device 100 and/or secondary device 200. In embodiments, secondary device 200 may be located in proximity to subscriber device 100, for example, within the same room, building or other structure, property, street, town or other municipality, county, state, country, or landmass as subscriber device 100, to name a few.

In embodiments, secondary device 200 may be, for example, a smoke detector (such as a Nest Protect Smoke Alarm), a fire detector, a carbon monoxide detector, a gas detector, a thermostat (such as a Nest thermostat, Honeywell Smart Thermostat or 3M Filrete Wi-Fi thermostat), a television (such as a "smart" television), a closed-circuit television (CCTV) device or other security camera device (such as Dropcam), a lighting device (such as LIFX bulbs), a remote device (such as a Logitech Harmony remote or Chamberlain remote device, Vera Lite Z Wave device, FortrezZ remote device, or Insteon Connected Kit), a Bluetooth device, a home security device (such as an ADT Home Automation device, Brinks Security Systems device, or August smart lock), an RFID transponder, a smartwatch (such as Samsung Gear, Magellan Echo, Sony Smart Watch, Android Wear, or Pebble Smart Watch), a crash or collision detector, an automobile computer system, a medical device such as a pacemaker, implantable defibrillator, insulin pump or infuser and/or diagnostic (such as Bionic Pancreas or dexcom G4platinum continuous glucose monitor), an intravascular catheter neuroprosthetic, a wearable medical diagnostic, and/or a wearable fitness diagnostic (such as a Fitbit One, Fitbit Zip, Fitbit Flex, New Balance Lifetrainer, Garmin Viovfit, Runtastic Orbit, Nike+ Fuelband DE, Body Media Fit Core Armband, Striiv Touch fitness tracker, Jawbone UP24 band, Misfit Shine, Withings Pulse 02 tracker, or Basis Health Tracker), to name a few. In embodiments, secondary device 200 may be a type of home network control middleware, for example. UPnP, HAVI, JINI, or Home Network Control Protocol (HNCP). In embodiments, secondary device 200 may be an electronic device configured to run one or more computer software applications that are configured to control the detection, e.g., through one or more sensors, one or more conditions of one or more users associated with subscriber device 100 and/or secondary device 200, and/or to an environmental condition that may relate to one or more users associated with subscriber device 100 and/or secondary device 200. In such embodiments, a secondary device 200 may be configured to run Apple Healthkit, Apple Homekit, or IFTTT. In embodiments, secondary device 200 may be an electronic device of a type similar to subscriber device 100 described above.

In embodiments, secondary device 200 may be a computing device configured for one or more physical inputs relating to one or more of a user associated with a subscriber device 100 and a condition of an environment within which a user associated with a subscriber device 100 is located, for example, a smartphone, a tablet computer, a laptop computer, a desktop computer, and/or a wearable computer, to name a few. In embodiments, secondary device 200 may be an electronic device specifically configured for use with alert communication server 300. In embodiments of the invention, the input received by the secondary device is a voice command, a signature wave or wipe at a mobile screen, extreme heat, smoke level, pulse rate, heart rate, carbon monoxide level, increased radioactivity, a pace maker failing, sudden shift in speed, blood pressure, blood sugar, respiration level; drug level; liver enzyme count, body temperature; and/or blood supply, any condition or combination of conditions that can be picked up by a sensor.

As described herein, support provider 400 may be a third party to a user associated with subscriber device 100 and/or to alert communication server 300. Support provider 400 may be an individual, system, or entity (e.g., a company or organization) that can provide assistance in response to a situation (e.g., a medical or environmental situation) communicated by subscriber device 100 and/or secondary device 200 via alert communication server 300. In embodiments, subscriber device 100 and/or secondary device 200 may communicate directly with support provider 400. In embodiments, support provider 400 may be, for example, a hospital, an emergency call center (such as 911), a hospital or other medical facility, a police station, a fire station, a poison control center, a private security organization, a neighborhood watch group, an emergency hotline, a situation room, or a digital expert system, to name a few. In embodiments, support provider 400 may be a relative, friend, or representative of a user associated with subscriber device 100. In embodiments, an entity providing alert communication server 300 may be the same as support provider 400, for example, a corporation or company that provides safety and/or security equipment and/or services.

Still referring to FIG. 1, and as described above, the subscriber device 100, the secondary device 200, and the support provider 400 are in electronic communication with alert communication server 300 across a data network 500. Data network 500 may be a wired and/or wireless data communication system, such as the Internet, a mobile data network (e.g., cellular or satellite), and/or a local intranet, to name a few. In embodiments, data network 500 may include a mesh network, e.g., a network formed of one or more local modalities of data communication, for example, Wi-Fi, infrared, Z-wave, and/or Bluetooth data transmission, to name a few. In embodiments, a mesh network or portions thereof may be capable of transmitting information across portions of alert communication network 1000 in situations in which an external data connection provider, such as a land-based or mobile data connection provider, experiences an outage.

For example, automobiles having short-range, mid-range, and/or long-range communication capability (e.g., Bluetooth transceivers and/or satellite transceivers) may be capable of communicating with one another, for example, during a traffic jam or other scenario in which other communications modalities (e.g., cellular data transmission) are unavailable. In this regard, automobiles or other similarly-configured transportable devices may act as nodes or communication points along alert communication network 1000.

Accordingly, subscriber device 100 and secondary device 200 may include interface software and/or hardware, such as that necessary to support wired or wireless and connections and/or communications for connection to alert communication server 300 across data network 500. Wired connections may be adapted for use with cable, POTS (telephone), fiber (such as Hybrid Fiber Coaxial), xDSL, to name a few, and wired connections may use coaxial cable, fiber, copper wire (such as twisted pair copper wire), and/or combinations thereof, to name a few. Wireless connections may include any cellular or cellular data connections (e.g., digital cellular, PCS, CDPD, GPRS, CDMA2000, Ev-DO, HSPA, UMTS, to name a few), Bluetooth, Wi-Fi, radio, satellite, infrared connections, and/or other electromagnetic waves, to name a few. Interface hardware and/or software, which may be used to communicate over wired and/or wireless connections, may comprise any of Ethernet interfaces (e.g., supporting a TCP/IP stack), X.25 interfaces, T1 interfaces, and/or antennas, to name a few. One or more communications portals (e.g., a communications portal of a device) may handle, process, support, and/or perform any wired and/or wireless communications and may comprise hardware and/or software.

Figure 2:
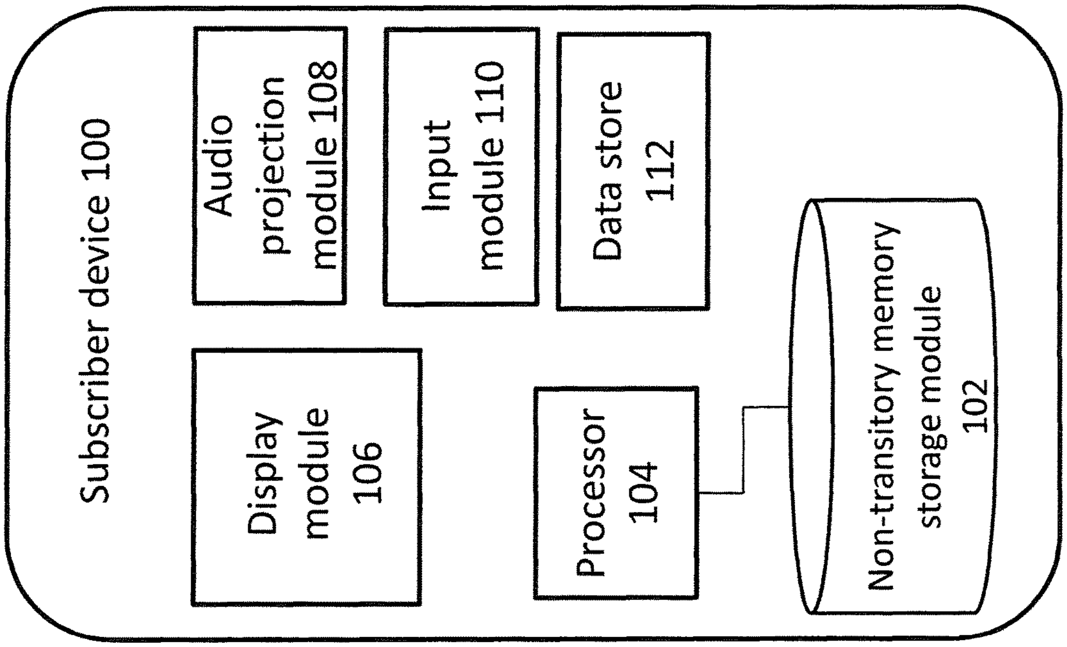
FIG. 2 is a schematic diagram of a subscriber device associated with the alert communication network of FIG. 1 according to an exemplary embodiment of the present invention.

Referring additionally to FIG. 2, a schematic diagram of subscriber device 100 is illustrated. As described above, subscriber device 100 may be a portable electronic device for use with alert communication network 1000. In embodiments, subscriber device 100 may be configured to display and/or project alert communications in a format that is visible, audible, and/or otherwise capable of being received by a human operator. In embodiments, subscriber device 100 is configured to receive one or more physical inputs, e.g., audio (such as voice), motion-based, and/or tactile inputs, from a user or other operator of subscriber device 100.

Subscriber device 100 may be configured to run a program product, e.g., a software program or other computer code associated with alert communication server 300. Accordingly, subscriber device 100 may include one or more non-transitory memory storage modules 102 upon which computer-readable instructions may be read. In embodiments, subscriber device 100 may include one or more processors 104 electronically coupled with the one or more non-transitory memory storage modules 102 so that a software program or other computer code associated with alert communication server 300 can be run on subscriber device 100.

As shown, subscriber device 100 as shown may include one or more software modules for handling various processes supporting the generation and/or transmission of data associated with alert communications. Software modules described herein with respect to subscriber device 100 may have associated hardware or may be installed on specific hardware. In embodiments, any function attributed to any software module described herein may be performed wholly or in part by one or more other software modules.

In the exemplary embodiment shown, subscriber device 100 may include a display module 106 for displaying information received from alert communication server 300. In embodiments, display module 106 may display content created and/or stored on subscriber device 100. In embodiments, display module 106 may be configured to display visual images, such as 2D images, e.g., still images or video, or 3D images such as holographic images. Accordingly, display module 106 may be electronically connected with a visual display hardware element, for example, an LCD screen, text display, or other electronic display.

Subscriber device 100 may include an audio projection module 108 for projection of data transmitted by alert communication server 300 as audible sounds. In embodiments, audio projection module 108 may be configured to cause the operation of a hardware element of subscriber device 100, for example, an audio speaker.

In embodiments, subscriber device 100 may include an input module 110 for receiving one or more physical inputs from a user, for example, a tactile input (such as the pressing of a button or contact with a capacitive touchscreen device), an audio input (such as a voice input), and/or a motion-based input (such as a hand or palm swipe, or the shaking or moving of a device), to name a few. In this regard, input module 110 may be operatively and electronically coupled with one or more hardware devices of subscriber device 100, for example, a microphone, keyboard, trackball or sensor pad, capacitive touchscreen, and/or accelerometer, to name a few.

In embodiments, subscriber device 100 may include a data store 112 for storing data related to one or more users associated with subscriber device 100. In embodiments, data store 112 may include data associated with biographical information, for example, name, age, date of birth, and relatives, to name a few. In embodiments, data store 112 may include medical information, for example, height, weight, predispositions to illnesses (e.g., family medical histories), ongoing and/or past medical diagnoses, and/or schedules of prescription medications, to name a few. In embodiments, data store 112 may include data associated with environmental information that may be generic or specific to locations to which subscriber device 100 is carried for example, geographic information such as terrain and/or elevations, climate information such as average temperatures and/or other weather patterns, allergen counts, and/or native species of plants or animals, to name a few. In embodiments, data store 112 may include data associated with other information related to a location in which subscriber device 100 is carried, for example, information on disease outbreaks and/or quarantines, travel restrictions, geopolitical data relating to local cultures, ongoing armed conflicts or wars, and/or governmental infrastructure, to name a few.

Figure 3:
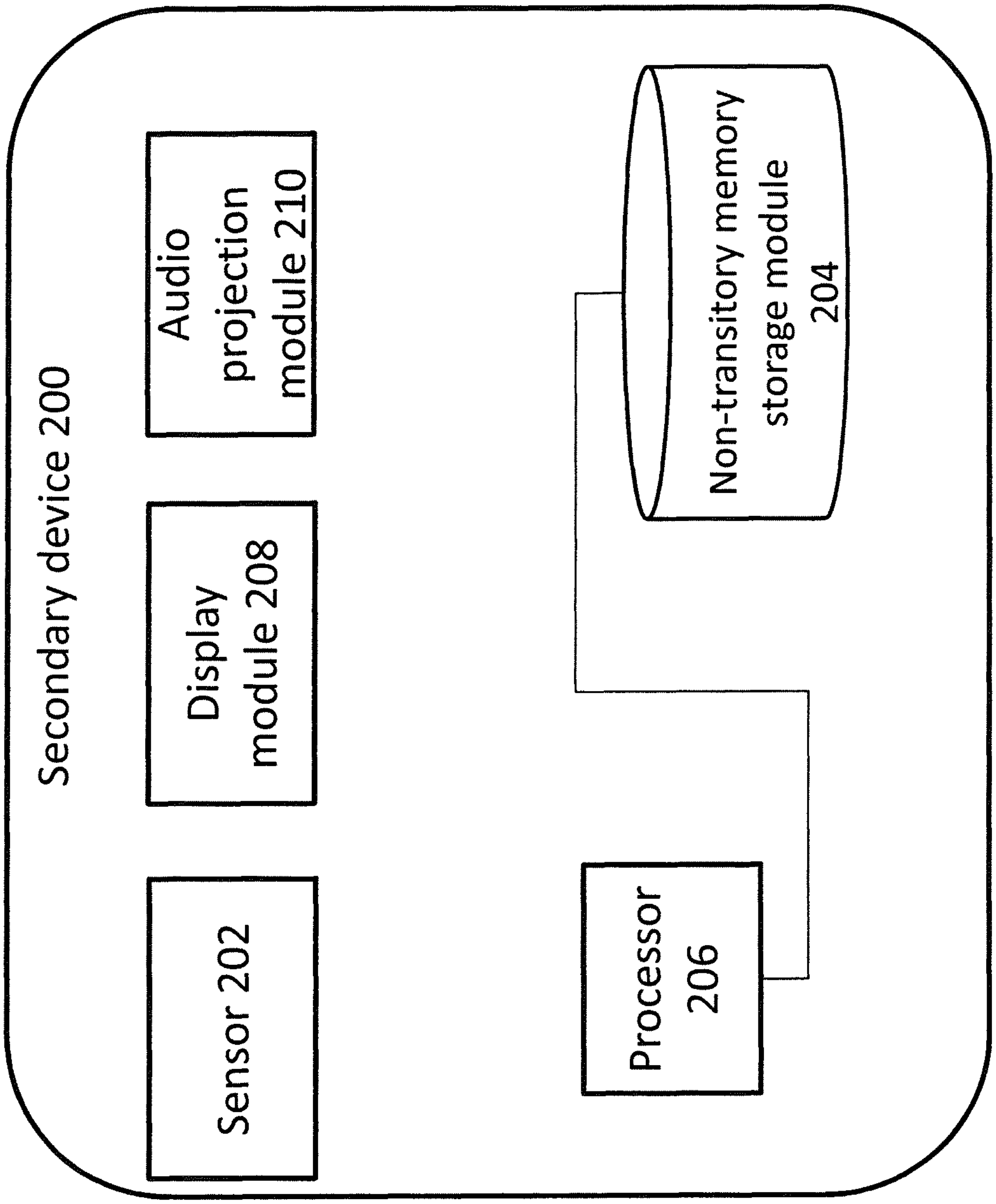
FIG. 3 is a schematic diagram of a secondary device associated with the alert communication network of FIG. 1 according to an exemplary embodiment of the present invention.

Still referring to FIG. 1 and FIG. 2, and referring additionally to FIG. 3, a schematic diagram of secondary device 200 is illustrated. As described above, secondary device 200 may be disposed within the same location as subscriber device 100 and may be configured to transmit data to alert communication server 300 relating to a condition of a user associated with subscriber device 100 and/or a condition of an environment in which a user associated with subscriber device 100 is located.

Accordingly, secondary device 200 may include at least one sensor 202 for detecting a condition related to a user associated with subscriber device 100 and/or to a condition of an environment surrounding secondary device 200. In embodiments, sensor 202 may be configured to detect one or more physical inputs in the form of, for example, heat, smoke, chemicals (which may be chemicals detected outside of a range surrounding a standard pre-set combination of air or specific chemicals programmed for detection into secondary device 200), radiation, sound, changes in ambient light, and/or unauthorized entry through a structure (such as a door or window), to name a few.

In embodiments, secondary device 200, via the at least one sensor 202, may be configured to detect medical and/or biometric information from a user associated with subscriber device 200, for example, blood pressure, heart rate, respiration, brain function, electrolyte level, blood chemical levels, liver enzyme counts, and/or body temperature, to name a few.

In embodiments, secondary device 200 may be configured to run a program product, e.g., a software program or other computer code, associated with alert communication server 300 in addition to or alternative to subscriber device 100. Accordingly, secondary device 200 may include one or more non-transitory memory storage modules 204 upon which computer-readable instructions may be read. Software modules described herein with respect to secondary device 200 may have associated hardware or may be installed on specific hardware. In embodiments, any function attributed to any software module described herein may be performed wholly or in part by one or more other software modules.

In embodiments, secondary device 200 may include one or more processors 206 electronically coupled with the one or more non-transitory memory storage modules 204 so that a software program or other computer code associated with alert communication server 300 can be run on secondary device 200. In embodiments, secondary device 200 may lack software programming, and may be configured as an electronic device with one or more sensors configured to communicate raw input data with alert communication server 300 and/or subscriber device 100.

In the exemplary embodiment shown, secondary device 200 may include a display module 208 for displaying information received from alert communication server 300. In embodiments, display module 208 may display content created and/or stored on alert communication server 300, subscriber device 100, and/or secondary device 200. In embodiments, display module 208 may be configured to display visual images such as text or graphics associated with data transmitted across alert communication network 1000. Accordingly, display module 208 may be electronically connected with a visual display hardware element, for example, an LCD screen, text display, or other electronic display.

In embodiments, secondary device 100 may include an audio projection module 210 for projection of data transmitted by alert communication server 300 as audible sounds. In embodiments, audio projection module 210 may be configured to cause the operation of a hardware element of secondary device 200, for example, an audio speaker.

Figure 4:
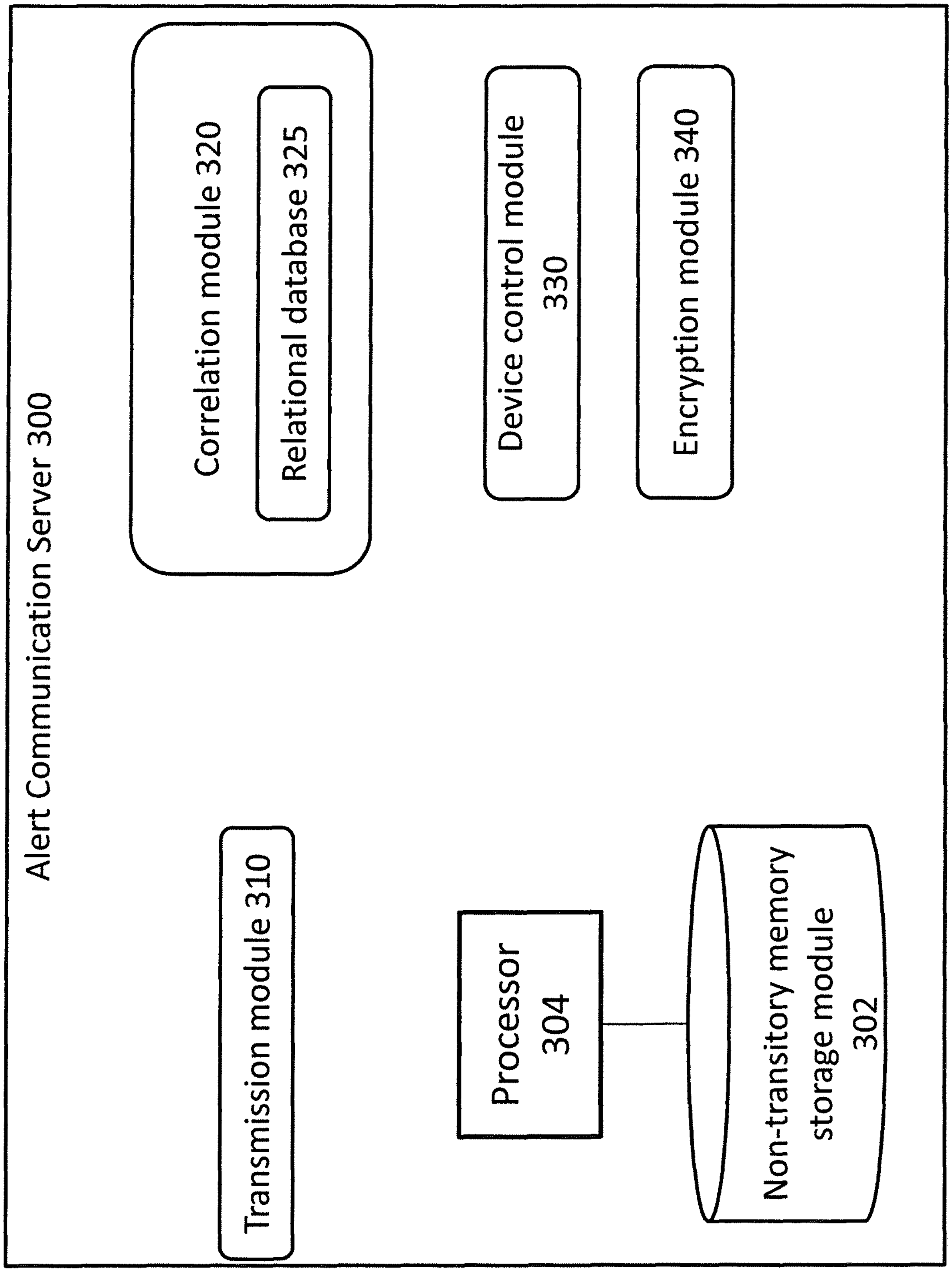
FIG. 4 is a schematic diagram of an alert communication server associated with the alert communication network of FIG. 1 according to an exemplary embodiment of the present invention.

Still referring to FIG. 1, FIG. 2, and FIG. 3, and referring additionally to FIG. 4, a schematic diagram of various components of alert communication server 300 is illustrated. As described herein, alert communication server 300 is configured receive, store, manipulate and/or transmit for display and/or projection electronic data associated with alert communications transmitted across alert communication network 1000. Alert communication server 300 may include one or more real and/or virtual data servers, such as in a cloud computing environment, so that data can be transmitted between different components of alert communication server 300. Alert communication server 300 or portions thereof may be provided, owned, and/or operated by a single entity, such as a natural person, or a legal entity, such as a company or service.

In embodiments, alert communication server 300 is configured to carry out a series of steps or processes directed to electronic data corresponding to alert communications transmitted across alert communication network 1000. Such steps may be one or more sets of instructions, rules, boundaries, and/or algorithms, to name a few, that result in the manipulation, modification, and/or transformation of a portion of the electronic data corresponding to such notifications and/or data.

In this regard, the entirety of or portions of alert communication server 300 may be formed of one or more computer systems having one or more computers. The computers may store data in one or more databases stored on storage devices having computer-readable memory. Storage devices can include one or more non-transitory computer readable memory stores 302, such as hard drives, flash memory, tapes, disks, CDs, DVDs, memory cards, server farms, and any hardware necessary to read and/or write to such non-transitory memory, such as disk drives, automatic or robotic disk loaders, CD drives, memory card writers, to name a few. The computers may also have one or more software modules run by on one or more processors 304 that are electronically coupled with the non-transitory memory stores 302 of the computers. In embodiments, the software modules may provide user interfaces for interacting (e.g., inputting data and/or receiving data) with a computer system. Accordingly, any of the computers may also include input devices (e.g., keyboards, cameras, touchpads, computer mouse devices, touchscreens, microphones) with accompanying software (e.g., speech-to-text software) and/or display devices (e.g., monitors, touchscreens, projectors (e.g., 2-D, 3-D, and/or holographic projectors to name a few).

In embodiments, any function attributed to any software module described herein may be performed wholly or in part by one or more other software modules. In embodiments, a software module may access a third party system or server to perform the ascribed functions.

As described above, alert communication server 300 transmits data associated with a user associated with subscriber device 100 and/or data associated with a condition of an environment surrounding the user between subscriber device 100, secondary device 200, and support provider 400.

In this regard, alert communication server 300 includes a transmission module 310 for communicating data to one or more of subscriber device 100, secondary device 200, and support provider 400. Transmission module 310 may be configured to communicate information across data network 500, for example, via textual transmission (e.g., SMS), audio data (e.g., cellular) transmission, and/or graphical transmission (e.g., audio or still images), to name a few.

In this regard, alert communication server 300 may be configured, for example, to send an alert notification to subscriber device 100. In embodiments, alert communication server 300 may be configured to contact, e.g., through an automated dialing program, a support provider 400.

In embodiments, transmission module 310 may transmit data onto an outward-facing (e.g., subscriber-facing) platform, for example, a website hosted by a portion of alert communication server 300, or a program product associated with alert communication server 300, for example, a mobile device, browser, and/or tablet application.

In embodiments, transmission module 310 may be configured to transmit data according to various digital data exchange formats, for example, Extensible Markup Language (XML), JavaScript Object Notation (JSON), or another data-serialization format such as YAML, to name a few.

In embodiments, transmission module 310 may be configured to determine an appropriate type of communication to one or more of subscriber device 100, secondary device 200, and/or support provider 400, for example, text-based, audio-based, and/or graphic-based communications, and/or content thereof. In embodiments, transmission module 310 may be configured to determine an appropriate device among a plurality of connected devices to which such a communication should be sent, for example, a speaker located near a subscriber device 100 from which an alert communication was originated.

In embodiments, alert communication server 300 includes a correlation module 320. Correlation module 320 may be configured to apply an algorithm to data provided by subscriber device 100 and secondary device 200 such that correlation module 320 can determine one or more conditions of one or more users associated with subscriber device 100 and/or secondary device 200, and/or to an environmental condition that may relate to one or more users associated with subscriber device 100 and/or secondary device 200. In this regard, correlation module 320 is configured to transform a set of data provided by a subscriber device 100 and a set of data provided by a secondary device 200, via a correlation algorithm, into data associated with an instruction for transmission module 310 to take an action across alert communication network 1000, e.g., a communication with one or more of subscriber device 100, secondary device 200, and support provider 400. In embodiments, correlation module 320 is configured to transform, via a correlation algorithm, a set of data provided by a subscriber device 100, a secondary device 200, and/or another source of data, for example, a set of data stored on a portion of alert communication server 300 or data received from another source, such as a third party data or content provider.

In embodiments, correlation module 320 may include a relational database 325, for example, a key-valued relational database configured to match one or more discrete units of data provided by subscriber device 100 and one or more discrete units of data provided by secondary device 200 to a set of data associated with an outcome relating to both sets of data. In embodiments, correlation module 320 may apply a stochastic method, e.g., an algorithm based upon probabilistic outcomes, to a set of data provided by subscriber device 100 and/or a set of data provided by secondary device 200, or Bayesian probabilities, e.g., an algorithm based upon the updated probability of a prior-calculated outcome based upon new data, to name a few, in order to determine an appropriate responsive action for transmission module 320. In embodiments, correlation module 320 may be configured to distinguish between a situation that is possible based upon available data and a situation that is probable based upon available data, e.g., by assigning numerical values to data sets and associating threshold numerical values to possible scenarios and probable scenarios. In embodiments, correlation module 320 may be configured to offer a choice to a user, for example, between multiple possible actions that can be enacted by alert communication server 300.

In embodiments, alert communication server 300 may include a device control module 330 configured to provide one or more instructions to initiate an action of subscriber device 100. In embodiments, device control module may provide one or more instructions to initiate an action of secondary device 200.

Device control module 330 may be configured to communicate, for example, with a computer application program run on subscriber device 100 that can access other hardware and/or software functions of subscriber device 100.

In embodiments, device control module 330 may be configured to cause an ongoing or scheduled computer software application or program to be overridden, e.g., shut down or prevented from initializing, due to an ongoing or upcoming action of alert communication network 1000.

In embodiments, device control module 330 may override and/or change default and/or preset settings and/or preferences of a device or associated software (such as a smartphone and/or an associated computer operating system), for example, overriding a volume silent setting, changing a device volume level, activating a system alarm, activating communication with a hands-free device (such as a Bluetooth unit), and/or automatically answer incoming calls, to name a few.

In embodiments, device control module 330 may cause a speaker device of subscriber device 100 to activate, for example to project an alarm or instructions to a user or others nearby (such as "SMOKE DETECTED," "FIRE DETECTED," "EVACUATE," and "PROCEED TO THE NEAREST EXIT," to name a few).

In embodiments, device control module 330 may cause a microphone device of subscriber device 100 to activate in order to detect audible sounds in the vicinity of subscriber device 100. In embodiments, such sounds may include calls for help by a user. In embodiments, device control module 330 may enable a perpetual-listening mode of subscriber device 100.

In embodiments, device control module 330 may cause a camera device of subscriber device 100 and/or secondary device to activate, for example, in order to take still images and/or video recordings of a surrounding environment. Such imagery may be transmitted to alert communication server 300, for example, for use in determining a condition relating to a user associated with subscriber device 100 and/or a condition of an environment surrounding subscriber device 100 and/or to locate an unresponsive user. In such embodiments, data transmitted to alert communication server 300 from a camera device of subscriber device 100 and/or secondary device 200 may be processed, for example, through object, facial, speech, and/or image recognition software such as open source (e.g., OpenCV) or proprietary (such as NEUROtechnology) digital signal processing, to visually recognize a variety of scenarios, for example, an incapacitated user, blood loss, etc.

In embodiments, device control module 330 may cause an LED or other light source of subscriber device 100 to activate, for example, in a strobing or other pattern (such as an Morse-type or recognizable signaling pattern, such as an SOS) to serve as a beacon to a victim or rescuer in a low-visibility environment.

In embodiments, device control module 330 may be configured to initiate a power saving mode for an internal power source of subscriber device 100, for example, to prolong operation of another function of subscriber device 100, such as a GPS antenna or other location device, cellular or data communication capability, or the display or projection of critical information, for example, relating to a life-saving procedure. In embodiments, device control module 330 may be configured to initiate a power saving mode of a selected portion of subscriber device 100, for example, a particular hardware function or software application. In embodiments, subscriber device 100 and/or secondary device 200 may be configured to initiate specific functions as instructed by alert communication server 300 when connected to a supplemental power supply, for example, an electrical power outlet, alternative power source such as through an automobile charger, and/or supplemental battery (such as via connection to a computer or tablet). For example, connection of a subscriber device 100 and/or secondary device 200 in the manner described above may activate a perpetual listening mode of subscriber device 100 and/or secondary device 200 such that a device microphone is continuously activated.

In embodiments, device control module 330 may be configured to cause subscriber device 100 to emerge from a low power or power saving mode (e.g., wake up subscriber device 100) as a prelude to any of the above-identified actions.

In embodiments, device control module 330 may control a function of secondary device 200. Functions of secondary device 200 described herein may be functions associated with subscriber device 100. For example, in embodiments, device control module 330 may cause an automated lock, for example, on a car door or house, to engage or disengage. In embodiments, device control module 330 may cause an automated fire suppression system to activate or deactivate.

In embodiments, device control module 330 may alter a function of an implanted or wearable medical device, for example, a pacemaker, defibrillator, or insulin pump. In embodiments, device control module 330 may cause an interface to display to allow the manual control of such functions by a user. In embodiments, such manual control may be restricted to predetermined individuals, e.g., medical personnel or next of kin.

In embodiments, device control module 330 may alter the functioning of a vehicle, for example, a vehicle under computerized control.

In embodiments, device control module 330 may be configured to cause a limited functionality mode, e.g., a silent mode in which sound projection is deactivated or a so-called airplane mode in which various cellular and data communication antennas are deactivated, to emerge into a full-functioning or a more-functioning mode as a prelude or in addition to any of the above-identified actions.

In embodiments, alert communication server 300 may include an encryption module 340 configured to encrypt data transmitted between alert communication server 300 and one or more of subscriber device 100, secondary device 200, and/or support provider 400. In embodiments, it may be desirable to encrypt or otherwise anonymize data being transmitted across alert communication network 1000 as it may include, for example, confidential medical information (e.g., under HIPAA statutes) or other personal information. Encryption module 340 may be configured to transform data using an encryption algorithm, for example, by associating data with one or more transitory digital keys or by applying a cipher to data. Encryption of data applied by encryption module 340 may be applied by computers running encryption software, separate encryption devices, or by the actions of one or more persons, e.g., prior to input of the encrypted and/or ciphered data into one or more computers. For example, in embodiments, a digital key may be stored in reverse order and/or translated (e.g., by adding 1 to each digit and/or advancing each alphabetic character by one position in the Western alphabet, by substitution such as by mapping each character to a different character (e.g., A=3, 5=P, to name a few), to name a few). In embodiments, other encryption algorithms can comprise scrambling of a sequence of characters, addition of characters, and/or hashing.

In embodiments, encryption module 340 may employ a public-key cryptographic algorithm, in which electronic devices connected to alert communication network 1000, e.g., subscriber device 100 and/or secondary device 200, may generate a public-private key pair, with the public key being registered with the encryption module 340. In subsequent communications between alert communication server 300 and subscriber device 100 and/or secondary device 200, a transport security layer (TLS) associated with encryption module 340 may employ, for example, asymmetric encryption for key exchange and symmetric encryption for data exchange.

Figure 5:
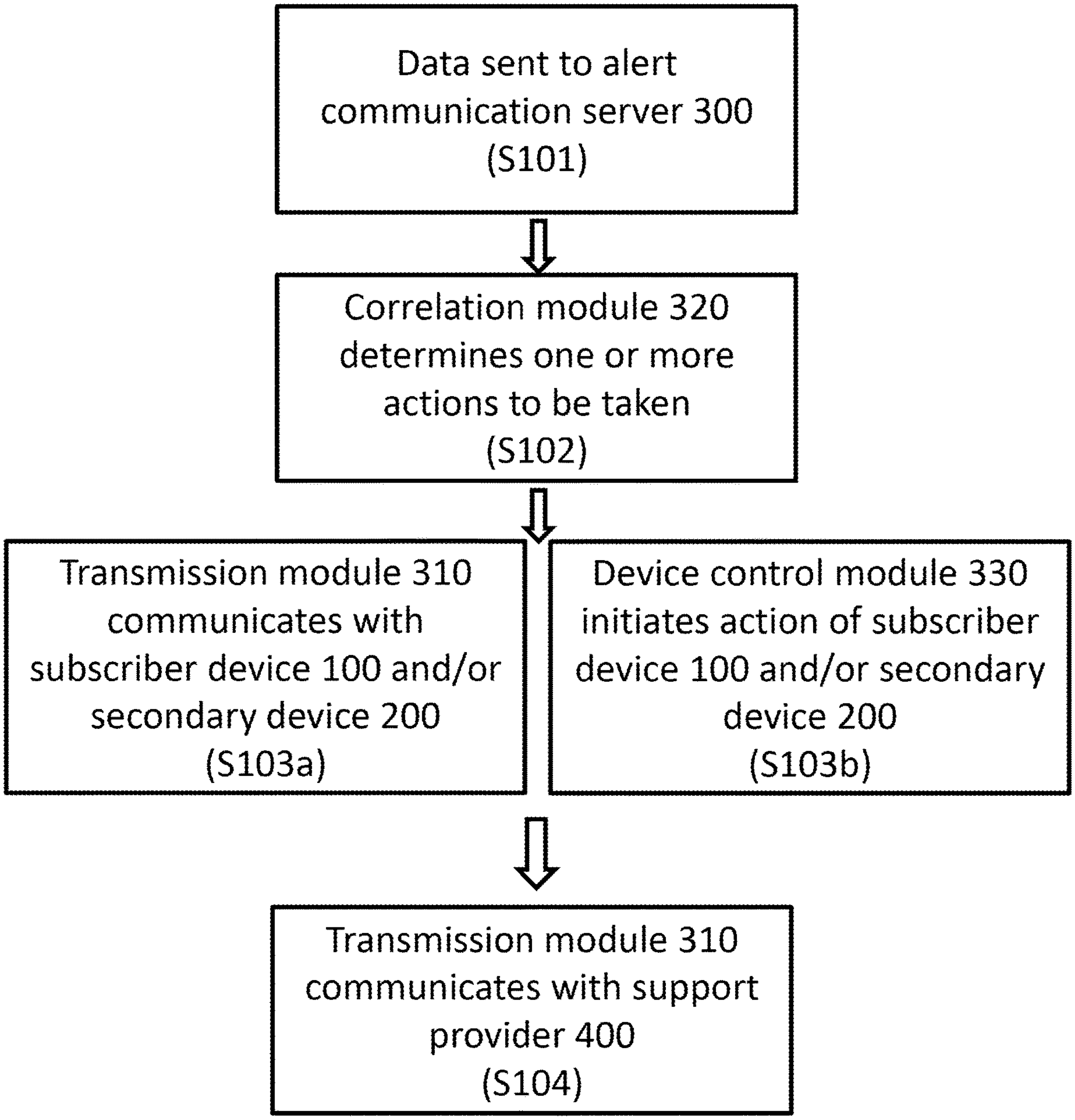
FIG. 5 is a process flow illustrating a process of an alert communication server associated with the alert communication network of FIG. 1 according to an exemplary embodiment of the present invention.

Still referring to FIG. 1, FIG. 2, FIG. 3, and FIG. 4, and with additional reference to FIG. 5, an exemplary embodiment of a process flow of a process of alert communication server 300 across alert communication network 1000 is illustrated according to an exemplary embodiment of the present invention.

In a first step S101, data is sent from one or both of subscriber device 100 and secondary device 200 to alert communication server 300. As described above, data transmitted from subscriber device 100 and/or secondary device 200 to alert communication server 300 may be, for example, sensor data generated from a physical input to subscriber device 100 and/or secondary device 200 and/or user-generated input to subscriber device 100 and/or secondary device 200, for example, voice, tactile, and/or motion based physical inputs as described above.

In embodiments, data sent from one or both of subscriber device 100 and secondary device 200 to alert communication server 300 may be in the form of a pre-set audio command input by a user. Such pre-set audio commands may designate an ongoing situation or combination of situations. In embodiments, a pre-set audio command may be, for example, "Holler Choking," "Holler Car Crash," or "Holler Fainted," to name a few. In embodiments, such pre-set audio commands may be used as common identifiers for specific situations, for example, by support providers, hardware providers (such as medical device providers), and/or software application providers.

In a second step S102, the correlation module 320 of alert communication server 300 determines one or more actions to be taken based upon data received from subscriber device 100 and/or secondary device 200. In embodiments, correlation module 320 may determine an action to be taken based upon data received from subscriber device 100, secondary device 200, and/or another source of data, such as data stored on another portion of alert communication server 300.

In a step S103*a*, transmission module 310 of alert communication server 300 communicates with one or both of subscriber device 100 and secondary device 200. As described above, transmission module 310 may provide a video-based, text-based, and/or audio-based communication with subscriber device 100, for example, sounding of an alert message or alarm, or display of a video or image as described above.

In a parallel step 103*b*, device control module 330 of alert communication server 300 may cause an action of subscriber device 100 and/or secondary device 200 as described above.

In embodiments, transmission module 310 may communicate with multiple subscriber devices 100, for example, in a situation in which multiple subscriber devices are located within a geographic area having a common hazard or ongoing environmental situation, such as a fire or natural disaster as indicated, for example, by one or more secondary devices 200. In such situations, transmission module 310 may recognize a geographic region such as a room, building or structure, road or city block, town, or campus, to name a few, as a dangerous zone and communicate with multiple subscriber devices 100 located within the dangerous zone in the manner described above. In embodiments, transmission module 310 may recognize a different geographic region, for example, one or more grids or sections of a GPS-generated map and/or one or more cellular transmission towers.

In an optional step S104, transmission module 310 of alert communication server 300 communicates with support provider 400 and/or another third party. In embodiments, alert communication network 1000 may be configured such that subscriber device 100 and/or secondary device 200 communicate directly with support provider 400, for example, as a result of an instruction transmitted by device control module 330, e.g., an automated dialing instruction. In embodiments, alert communication server 300 may transmit data provided by subscriber device 100 and/or secondary device 200 relating to a condition of a user of subscriber device 100 and/or a condition of an environment associated with subscriber device 100 to support provider 400, for example, realtime medical information that may be used in lifesaving efforts.

In embodiments, an action of alert communication server 300 as described above may be overridden, for example, by manual input of a user to subscriber device 100 and/or secondary device 200 (e.g., a button or one-touch action on a capacitive touchscreen). Such a cancelling action may be performed at any point during the steps described above. In embodiments, a cancellation action may prompt a notification, for example, to support provider 400, who may then contact the subscriber device 100 and/or secondary device 200 for confirmation that an emergency situation has subsided.

Figure 6:
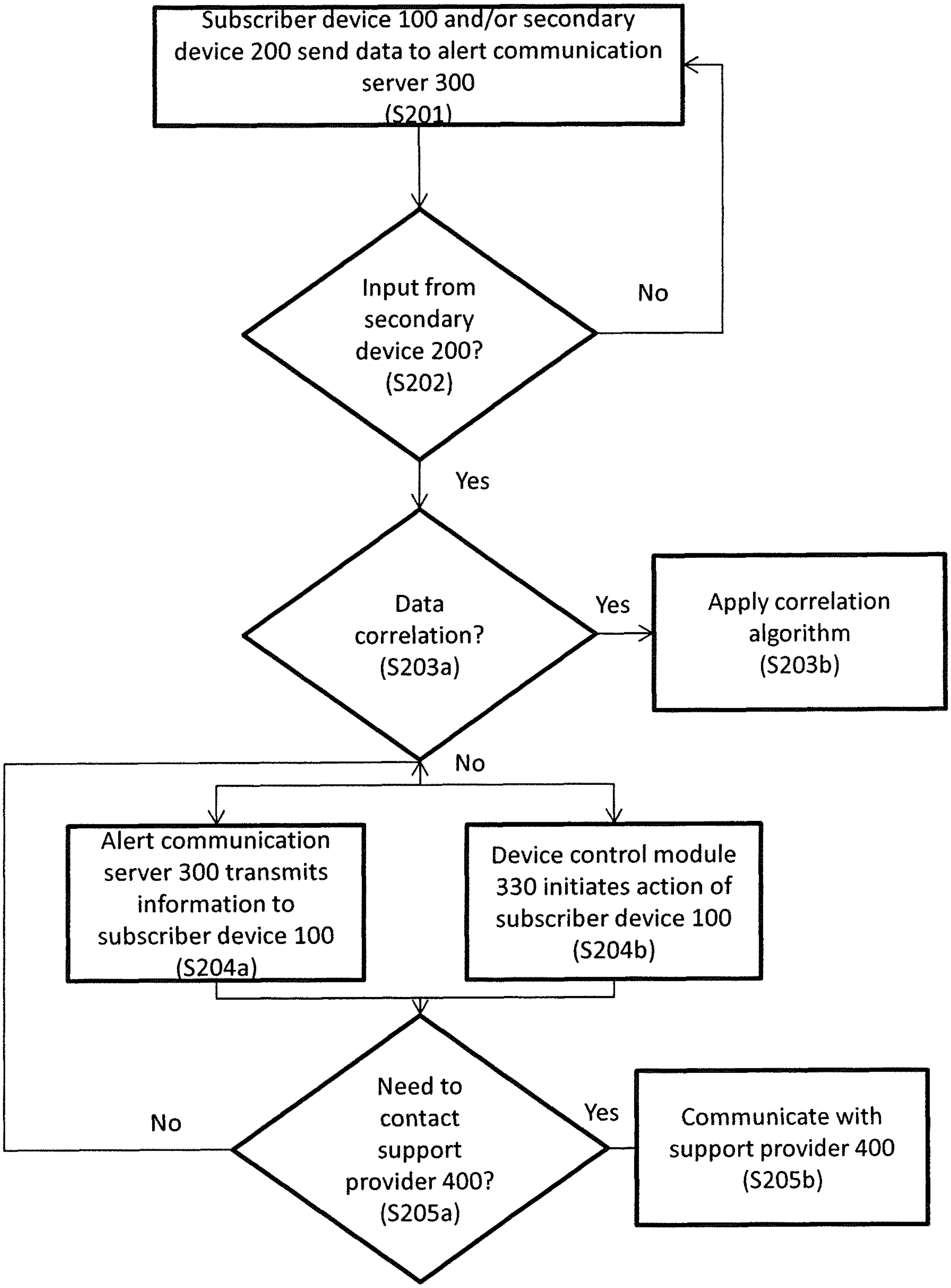
FIG. 6 is a flow chart illustrating a process of an alert communication server associated with the alert communication network of FIG. 1 according to an exemplary embodiment of the present invention.

Turning now to FIG. 6, and with continued reference to FIG. 1, FIG. 2, FIG. 3, and FIG. 4 and FIG. 5, a flow chart of a series of steps of alert communication server 300 is illustrated according to an exemplary embodiment of the present invention.

In a first step S201, one or both of subscriber device 100 and secondary device 200 send an alert to alert communication server 300. As described above, subscriber device 100 and/or secondary device 200 may be caused to send alert data to alert communication server 300, for example, through a physical input generated by a user (such as by voice command or tactile input) or through another physical input such as through sensor 202 of secondary device 200. Such inputs may be automated or manually enacted by a user or other operator.

In an optional second step S202, alert communication server 300 may seek input from secondary device 200 in the event that alert data has been received only from subscriber device 100 or vice-versa. In embodiments, alert communication server 300 may seek input from a different source, such as data stored on a portion of alert communication server 300, in the event that an alert has been received from both subscriber device 100 and secondary device 200. In embodiments, alert communication server 300 may await input from a secondary data source in the manner described above for a predetermined interval of time, for example, under the control of a timer associated with alert communication server 300, before taking further action across alert communication network 1000, before which time the process may revert to step S201 described above.

In a step S203, correlation module 320 determines whether an alert received from subscriber device 100 correlates with any information received from secondary device 200 or vice-versa. In embodiments, correlation module 320 may attempt to correlate data received from subscriber device 100 and/or secondary device 200 with data from another source, such as data stored in another portion of alert communication server 300. In embodiments, alert communication server 300 may be configured to obtain additional data, for example at periodic intervals such as in software updates, through an interface, e.g., an API, associated with one or more external databases, e.g., the National Weather Service, news organizations, or public address systems, to name a few.

In a step S204*a*, transmission module 310 transmits information to subscriber device 100. As described above, transmission module 310 may provide a video-based, text-based, and/or audio-based communication with subscriber device 100, for example, sounding of an alert message or an alarm and/or display of a video or image.

In an optional parallel step S204*b*, device control module 330 initiates an action of subscriber device 100. As described above, device control module 330 may cause a microphone device of subscriber device 100 to activate. In embodiments, device control module 330 may cause an LED or other light source of subscriber device 100 to activate, for example, in a strobing or other fashion to serve as a beacon to a victim or rescuer in a low-visibility environment. In embodiments, device control module 330 may be configured to initiate a power saving mode for an internal power source of subscriber device 100, for example, to prolong operation of another function of subscriber device 100, such as a GPS antenna or other location device, cellular or data communication capability, or the display or projection of critical information, for example, relating to a life-saving procedure. In embodiments, device control module 330 may instruct subscriber device 100 to initiate a communication, for example, a telephone call, with another entity, for example support provider 400 or another third party. In embodiments, device control module 330 may initiate an action of secondary device 200. In embodiments, an action of the device control module 330 as described herein may include a transmission to a subscriber device 100 from transmission module 310, or vice-versa. In embodiments, device control module 330 may initiate an action of secondary device 200 as described above.

In a step S205*a*, alert communication server 300 determines whether support provider 400 or another entity needs to be contacted. Such an action may be obviated, for example, in the event that device control module 330 has instructed subscriber device 100 to initiate a communication directly with support provider 400 or another entity as described above in step S204*b*. In embodiments, such an action may by initiated by a user, for example, a manual cancelling of an ongoing action of alert communication server 300 by a tactile input through subscriber device 100.

In embodiments, alert communication server 300 may contact support provider 400 or another entity in addition to a direct communication from subscriber device 100, for example, for redundancy to ensure that support provider 400 is properly notified of an ongoing situation and/or in the event that the direct communication from subscriber device 100 is interrupted (for example, by an environmental condition or the user associated with subscriber device 100 becomes unable to complete the communication). In such embodiments, in a step S205*b*, alert communication server 300 initiates a communication with support provider 400 or another entity. In the event that no contact of a support provider 400 is needed, the process may revert to steps S204*a* and S204*b* as described above.

In embodiments, an action of alert communication server 300 as described above may be overridden, for example, by manual input of a user to subscriber device 100 and/or secondary device 200 (e.g., a button or one-touch action on a capacitive touchscreen). Such a cancelling action may be performed at any point during the steps described above. In embodiments, a cancellation action may prompt a notification, for example, to support provider 400, who may then contact the subscriber device 100 and/or secondary device 200 for confirmation that an emergency situation has subsided. In embodiments of the invention, the server is configured to transmit an electronic communication to the secondary device, for example, a voice announcement, text message, or a video message. In further embodiments, the server is configured to take action if the user does not respond to the communication. In still other embodiments, the server is configured to receive a "de-activation prompt" from a subscriber device or a secondary device to terminate server communication (e.g. when an emergency is not in progress).

Figure 7A:
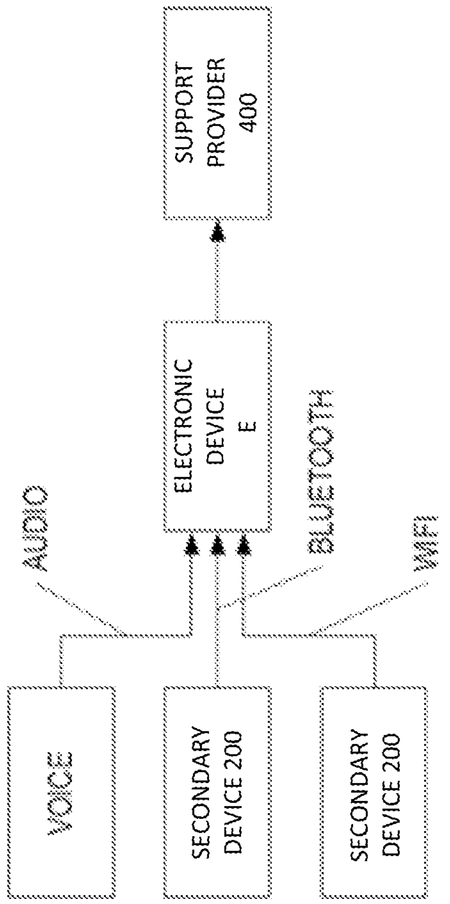
FIG. 7A is a schematic diagram of an alternative configuration of various components of the alert communication network of FIG. 1 according to an exemplary embodiment of the present invention.

Referring now to FIG. 7A, a schematic diagram of an alternative configuration of alert communication network 1000 is illustrated. As described above, an electronic device E, which may be a subscriber device 100 or a secondary device 200, is configured to receive one or more input commands, which may be data in the form of an audio, visual, or tactile command (e.g., spoken words, image recognition, or swipe). In embodiments, data may be provided directly by one or more secondary device 200. Electronic device E may be connected to secondary devices 200 or other electronic devices via data network 500, which may include, for example, Bluetooth or Wi-Fi data transmission.

As shown, electronic device E may be configured to communicate with one or more support provider 400 as described above. In this regard, electronic device E may be configured to host, via software run one on or more non-transitory memory storage devices, a portion of alert communication server 300 such that electronic device E becomes, for example, a compact and/or portable device for coordination with input data from a surrounding environment (e.g., direct physical inputs and/or data provided by one or more secondary device 200) for communication with one or more support provider 400.

Figure 7B:
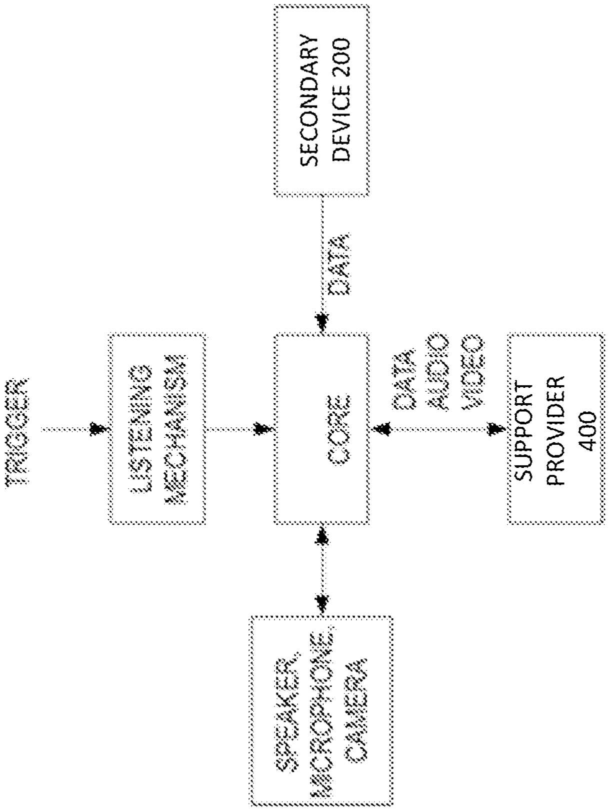
FIG. 7B is a schematic diagram of another alternative configuration of various components of the alert communication network of FIG. 1 according to an exemplary embodiment of the present invention.

Turning to FIG. 7B, in an embodiment, a core of the alert communication network 1000 (e.g., alert communication server 300, which may be partially or wholly supported on a subscriber device 100 and/or secondary device 200 on one or more non-transitory computer-readable memory storage devices) is configured to receive one or more input commands, which may be data in the form of an audio, visual, motion-based, or tactile command (e.g., spoken words, image recognition, or swipe). In embodiments, such input data may be in the form of an audio input (such as a predetermined spoken word or phrase) detected by a listening mechanism (e.g., a microphone) of subscriber device 100 and/or secondary device 200 that causes a communication with the core of alert communication network 1000.

In embodiments, such input data may be in the form of another trigger, such as an input to a hardware device of subscriber device 100 and/or secondary device 200, for example, a speaker, microphone, and/or camera device. In embodiments, raw data may be received by a core of alert communication network 1000 from a secondary device 200, as shown.

In this regard, alert communication server 300 presents a core of alert communication network 1000 through which data from multiple electronic devices can be coordinated, processed, analyzed, and/or transformed to determine one or more appropriate courses of action to take through control and/or communication with a connected electronic device, and/or communication with a support provider.

Figure 7C:
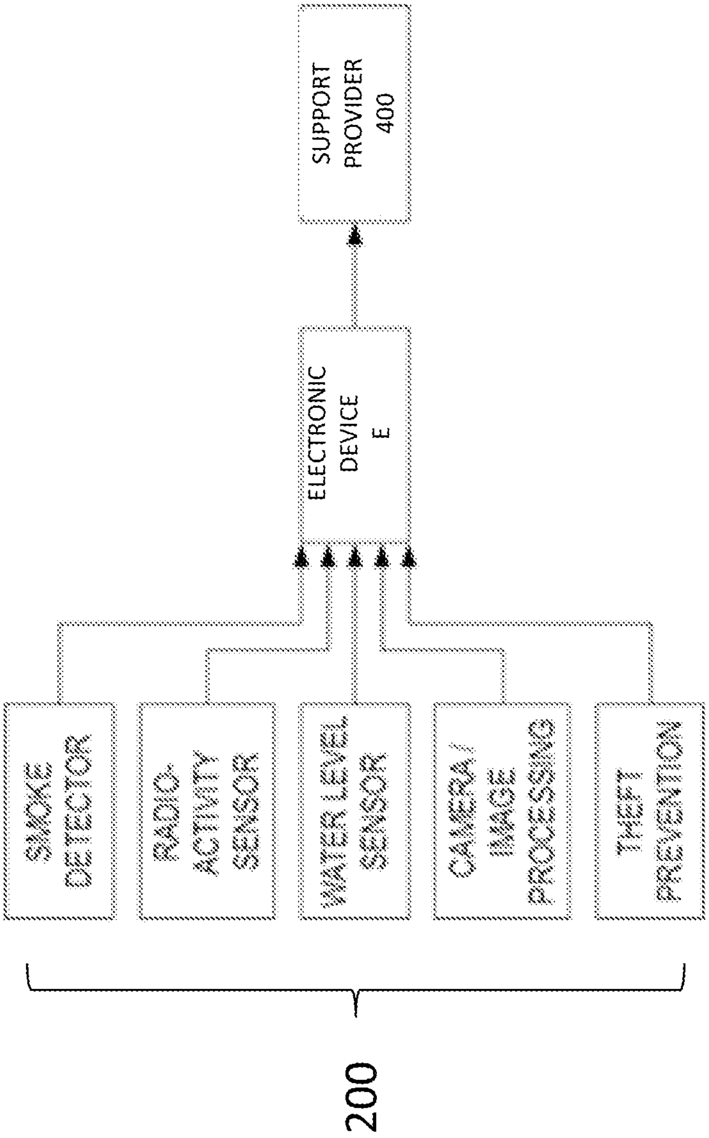
FIG. 7C is a schematic diagram of another alternative configuration of various components of the alert communication network of FIG. 1 according to an exemplary embodiment of the present invention.

Turning to FIG. 7C, in an embodiment, a plurality of secondary devices 200 are shown in data communication with electronic device E, which may be a subscriber device 100 and/or a secondary device 200. In the exemplary embodiment shown, the plurality of secondary devices 200 include a smoke detector, a radioactivity sensor, a water level sensor, a camera or other image processing device, and/or a theft prevention device. In embodiments, a different combination of secondary devices 200 may be arranged in data communication with an electronic device E.

As shown, the plurality of secondary devices 200 are electronically connected to electronic device E to cause and/or enhance (e.g., by the supplementation of sensor data) communication with a support provider 400.

Now that embodiments of the present invention have been shown and described in detail, various modifications and improvements thereon can become readily apparent to those skilled in the art. Accordingly, the exemplary embodiments of the present invention, as set forth above, are intended to be illustrative, not limiting. The spirit and scope of the present invention is to be construed broadly.

The invention claimed is:

1. An alert communication server, comprising:

one or more processors;

non-transitory computer-readable memory upon which a set of instructions are stored, the non-transitory computer-readable memory electronically coupled with the one or more processors to implement a set of instructions;

the server being in communication with a first user device and a second user device; whereby the first user device comprises a mobile phone, the server receiving through the mobile phone biographical data associated with a user and storing the biographical data associated with the user;

the second user device comprising a wearable computer being configured to receive motion-based input;

whereby, the server is configured to receive motion-based input from the wearable computer and to correlate the motion-based input with the biographical data associated with the user, and whereby, based on the correlation of motion-based input with biographical data, to transmit a message to be displayed on the wearable computer; and the server is further configured to receive input based on the correlation of the motion-based input from the wearable computer and the biographical data to determine whether a third-party support provider should be contacted and to transmit a message to the third-party support provider.

2. The alert communication server of claim 1, whereby the message to be displayed on the wearable computer comprises a text-based message.

3. The alert communication server of claim 1, whereby the biographical data comprises any one or more of name, age, date of birth, height, weight, illnesses information, medical diagnoses, and schedules for prescription medications.

4. The alert communication server of claim 1, whereby the biographical data comprises a geographical location of the mobile phone.

5. The alert communication server of claim 1, whereby the alert communication server is configured to be in electronic communication with the wearable computer and the third-party support provider.

6. The alert communication server of claim 5, whereby the alert communication server is configured to receive a deactivation prompt from the wearable computer or the first user device and terminate electronic communication with the wearable computer upon receiving the deactivation prompt.

7. The alert communication server of claim 1, further configured to receive input from the wearable computer to cancel the determination to contact the third-party support provider.

8. The alert communication server of claim 7, whereby the third-party support provider is an emergency first responder service.

9. The alert communication server of claim 1, whereby the motion-based input comprises a sudden shift in speed.

10. The alert communication server of claim 1, whereby the alert communication server is further configured to automatically dial the third-party support provider based on the determination to contact the third-party support provider.

11. The alert communication server of claim 1, whereby the message to be displayed on the wearable computer comprises any of a video message, sounding of an alarm on the wearable computer, display of an image, display of a video, and an audio communication.

12. An alert communication server, comprising:

one or more processors;

non-transitory computer-readable memory upon which a set of instructions are stored, the non-transitory computer-readable memory electronically coupled with the one or more processors to implement a set of instructions;

the server being in communication with a first user device and a second user device; whereby the first user device comprises a mobile phone, the server receiving through the mobile phone biographical data associated with a user and storing the biographical data associated with the user;

the second user device comprising a wearable computer being configured to receive motion-based input;

whereby, the server is configured to receive motion-based input from the wearable computer and to correlate the motion-based input with the biographical data associated with the user, and whereby, based on the correlation of motion-based input with biographical data, the server transmits a message to be displayed on the wearable computer; and the server is further configured to determine;

i. whether to send audio alert communications to the first user device or the second user device;

ii. whether to contact a third party;

iii. based upon the determination in step ii, further determine which third party from among a plurality of third parties to contact.

13. The alert communication server of claim 12, whereby the biographical data associated with the user comprises any one or more of blood pressure, heart rate, and body temperature.

14. An alert communication server, comprising:

one or more processors;

non-transitory computer-readable memory upon which a set of instructions are stored, the non-transitory computer-readable memory electronically coupled with the one or more processors to implement a set of instructions;

the server being in communication with a first user device and a second user device; whereby the first user device comprises a mobile phone, the server receiving through the mobile phone biographical data associated with a user and storing the biographical data associated with the user, the first user device being configured to receive first motion-based input;

the second user device comprising a wearable computer being configured to receive second motion-based input;

whereby, the server is configured to receive a first set of data from the mobile phone, the first set of data comprising at least the first motion-based input and whereby the server is configured to receive a second set of data from the wearable computer, the second set of data comprising at least the second motion-based input, the server is further configured to correlate the first set of data and the second set of data, and based on the correlation of the first set of data and the second set of data:

override a software application running on the mobile phone or the wearable computer;

send a notification to the wearable computer, the notification comprising an audio message or a visual message;

initiate a timer for an interval of time until further instructions are provided by the server; and after the expiration of the timer, transmit a message to a third-party support provider.

15. The alert communication server of claim 14, whereby the server is configured to detect audible sounds from a microphone provided on either the first user device or the second user device.

16. The alert communication server of claim 15, whereby the biographical data associated with the user comprises geographical data.

* * * * *